United States Patent
Delaplace et al.

(10) Patent No.: US 7,164,366 B2
(45) Date of Patent: Jan. 16, 2007

(54) PROCESS AND DEVICE FOR DETECTING ON AN AIRCRAFT AN OVERSHOOT OF DESIGN LOADS AT THE LEVEL OF A STRUCTURAL PART OF SAID AIRCRAFT

(75) Inventors: Franck Delaplace, Toulouse (FR); Sylvie Marquier, Toulouse (FR); Gérard Mathieu, Pibrac (FR); Gennaro Squeglia, Colomiers (FR)

(73) Assignee: Airbus France, Toulouse (FR)

( * ) Notice: Subject to any disclaimer, the term of this patent is extended or adjusted under 35 U.S.C. 154(b) by 170 days.

(21) Appl. No.: 10/998,811

(22) Filed: Nov. 30, 2004

(65) Prior Publication Data

US 2005/0192718 A1 Sep. 1, 2005

(30) Foreign Application Priority Data

Dec. 19, 2003 (FR) .................................. 03 14953

(51) Int. Cl.
*G08B 21/00* (2006.01)
(52) U.S. Cl. ...................... 340/945; 340/967; 340/969; 340/970; 340/973; 340/979; 340/438
(58) Field of Classification Search ................ 340/945, 340/971, 973, 967, 968, 969, 970, 979, 438; 701/1, 3, 4, 14, 211
See application file for complete search history.

(56) References Cited

U.S. PATENT DOCUMENTS

| | | | |
|---|---|---|---|
| 4,302,745 A | 11/1981 | Johnston et al. | |
| 5,359,326 A | 10/1994 | Bivens et al. | |
| 5,511,430 A | 4/1996 | Delest et al. | |
| 5,912,627 A | 6/1999 | Alexander | |
| 6,353,734 B1 * | 3/2002 | Wright et al. | 455/98 |
| 6,381,538 B1 * | 4/2002 | Robinson et al. | 701/211 |
| 6,871,123 B1 * | 3/2005 | Shimel | 701/3 |

* cited by examiner

*Primary Examiner*—Hung Nguyen
(74) *Attorney, Agent, or Firm*—Stevens, Davis, Miller & Mosher, LLP

(57) ABSTRACT

A process and device for detecting on an aircraft an overshoot of design loads at the level of a structural part of the aircraft. The detection device includes a speed measuring device for measuring an effective speed of the aircraft. A first comparator compares the measured effective speed with a maximum speed relating to the current flight configuration of the aircraft. A vertical load measuring device measures a vertical load factor of the aircraft, and a second comparator compares the measured vertical load factor with a limit value of the vertical load factor. An inspection determining device determines whether a structural inspection needs to be performed at the level of the structural part, based of the results of the first and second comparisons.

16 Claims, 3 Drawing Sheets

PROCESS AND DEVICE FOR DETECTING ON AN AIRCRAFT AN OVERSHOOT OF DESIGN LOADS AT THE LEVEL OF A STRUCTURAL PART OF SAID AIRCRAFT

FIELD OF THE INVENTION

The present invention relates to a process and a device for detecting on an aircraft an overshoot of design loads at the level of a structural part of said aircraft, either directly, or on elements arranged on said structural part.

BACKGROUND OF THE RELATED ART

The expression design loads is understood to mean, within the context of the present invention, the maximum loads that can be supported by the structural parts taken into account without permanent deformations appearing.

With the obvious aim of safety, an inspection of said structural parts of the aircraft, as well as the repair of any flaws, need to be performed as soon as said design loads are overstepped.

Such an inspection is generally triggered following the generation by an incident detection computer, for example of the FWC ("Flight Warning Computer") type, of a speed overshoot alarm (also known as an "overspeed warning").

In general, such an alarm is tripped when an overshoot of more than four knots of a permitted maximum speed (Mach number) dependent on the current configuration of the aircraft, is detected.

The various maximum speeds (Mach number) are determined by virtue of load models specific to each zone of the aircraft, in such a way that the constituent elements of the aircraft do not undergo any structural load of such a kind as to damage them.

Such an overshoot of maximum speed (Mach number) may occur upon unusual maneuvers, upon encountering significant turbulence or upon erroneous actions on the part of the pilot.

The activation of this alarm compels the airline, in accordance with the maintenance manual, to perform a maintenance check of the aircraft. This operation is aimed at verifying the ability of the structure of the aircraft to properly withstand the loads encountered during the speed excursion (Mach number) beyond the flight domain.

This check consists in visually ascertaining that cracks/fissures have not developed and/or that structural elements or ties are not deformed and in verifying that the various systems potentially affected are still operating normally.

Such maintenance checks therefore immobilize the aircraft on the ground, which of course penalizes the airline.

Moreover, statistical information originating from airlines points to a relatively significant frequency of occurrence of speed overshoot. In fact, for more round trips, airlines often ask their pilots to fly at speeds close to the maximum speeds. In consequence, a simple gust of wind or turbulence triggers the alarm, thereby compelling the airline to perform the maintenance check as described in the aircraft's maintenance manual.

Now, it is apparent that, in a very large majority of cases, no damage at the level of the structure of the aircraft of crack, fissure, etc type has been observed. Thus, it is apparent that the criterion compelling or otherwise the carrying out of a maintenance check following a speed overshoot alarm of the aforesaid type, is excessive and unsuited to the requirement.

SUMMARY OF THE INVENTION

An object of the present invention is to remedy these drawbacks.

It relates to a process for detecting on an aircraft, in a particularly efficient and reliable manner, any overshoot of design loads at the level of a structural part (namely on the structural part itself and/or on elements carried by it) of said airplane, while avoiding structural inspections that are visibly unjustified from a technical point of view.

For this purpose, according to the invention, said process according to which the following steps are carried out repetitively and automatically:
  a) an effective speed of the aircraft is measured;
  b) a first comparison is carried out, by comparing this measured effective speed with at least one maximum speed relating at least to the current flight configuration of the aircraft; and
  c) one determines whether a structural inspection needs to be performed at the level of said structural part, at least on the basis of the result of said first comparison, is noteworthy in that, repetitively and automatically:
  before said step c):
  α) a vertical load factor of the aircraft is measured; and
  β) a second comparison is carried out, by comparing said measured vertical load factor with at least one limit value of the vertical load factor; and
  in said step c), one determines whether a structural inspection needs to be performed at the level of said structural part, at least on the basis of the results of said first and second comparisons.

Thus, by virtue of the monitoring of the vertical load factor and the taking into account in a combined manner (as specified hereinbelow) of two types of overshoot (overshoot of the maximum speed and overshoot of the maximum vertical load factor), a refined evaluation of the load level to which the structural part and/or the elements that it carries have been subjected is obtained. This makes it possible to appreciably reduce the number of inspections (or maintenance checks) to be triggered and therefore the drawbacks resulting therefrom.

Advantageously, in step β), said measured vertical load factor is compared with an upper limit value and with a lower limit value, in step b), said measured effective speed is compared with first and second maximum speeds, and in step c), one concludes that a structural inspection needs to be performed, when one of the following three conditions is achieved:
  said measured effective speed is below said first maximum speed and said measured vertical load factor is outside a first domain formed by said upper and lower limit values;
  said measured effective speed lies between said first and second maximum speeds and said measured load factor is outside a second predetermined domain; and
  said measured effective speed is greater than said second maximum speed.

Firstly, advantageously, when lift-enhancing elements of the airfoil of the aircraft are deployed, said first and second maximum speeds depend on a maximum speed with deployed lift-enhancing elements VFE.

In this case, preferably, said first maximum speed VF satisfies the relation VF=VFE+k, k being a value dependent on the position of said lift-enhancing elements, and said second maximum speed Vmax1 satisfies the relation Vmax1=VF+V1, V1 being a predetermined speed value.

Secondly, advantageously, when the aircraft is in a cruising configuration, said first and second maximum speeds depend on a maximum speed of use VMO.

In this case, preferably, said first maximum speed corresponds to said maximum speed of use VMO, and said second maximum speed Vmax2 satisfies the relation Vmax2=VMO+V2, V2 being a predetermined speed value.

Thirdly, advantageously, when the main landing gear of the aircraft is down, said first and second maximum speeds depend on a maximum speed with landing gear down.

In a particular embodiment, in step b), said measured effective speed is compared with an auxiliary maximum speed, and in step c), a maximum speed overshoot warning is issued when said measured effective speed is greater than said auxiliary maximum speed. This warning makes it possible to apprise the crew that the aircraft has left the authorized flight domain, so that they may act such as to rectify the speed of the aircraft. Nevertheless, in accordance with the present invention, this condition alone does not compel the airline to perform the maintenance check, in contradistinction to the usual solutions mentioned hereinabove.

Furthermore, advantageously:
said maximum speed also depends on at least one particular characteristic (open door, under-airfoil carriage, fuel distribution, etc.) of the aircraft; and/or
said measured vertical load factor (or any other considered and measured parameter) is filtered before being compared with at least one limit value; and/or
in step c), the result of a comparison needs to be confirmed over a predetermined duration before being taken into account; and/or
at least one of the thresholds (maximum speed, limit value, etc.) used for a comparison depends on structural parts of the aircraft that are taken into account (airfoil, slats, ailerons, spoilers, flaps, etc.).

In a particular embodiment, repetitively and automatically:
before said step c):
the value of at least one additional particular parameter is measured:
an additional comparison is carried out, by comparing said measured value with at least one limit value of said particular parameter; and
in said step c), one determines whether a structural inspection needs to be performed at the level of said structural part, by also taking account of the result of said additional comparison.

Thus, in this particular embodiment, one (or more) additional parameter(s) is(are) also taken into account.

Preferably, at least one of the following parameters is taken into account as additional particular parameter:
the weight of the aircraft;
the centering of the aircraft;
the dynamic pressure; and
at least one particular cue (for example a cue relating to a strain gauge).

The present invention also relates to a device for detecting on an aircraft an overshoot of design loads at the level of a structural part of said aircraft.

According to the invention, said device of the type comprising
first means for measuring an effective speed of the aircraft;
second means for carrying out a first comparison, by comparing this measured effective speed with at least one maximum speed relating to the current flight configuration of the aircraft; and
third means for determining whether a structural inspection needs to be performed at the level of said structural part, at least on the basis of the result of said first comparison,
is noteworthy in that:
said device furthermore comprises:
fourth means for measuring a vertical load factor of the aircraft; and
fifth means for carrying out a second comparison, by comparing said measured vertical load factor with at least one limit value of vertical load factor; and
said third means are formed so as to determine whether a structural inspection needs to be performed at the level of said structural part, on the basis of the results of said first and second comparisons.

In a particular embodiment, said device moreover comprises sixth means, for example display means and/or printing means, for indicating to an operator as appropriate, that a structural inspection needs to be performed.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
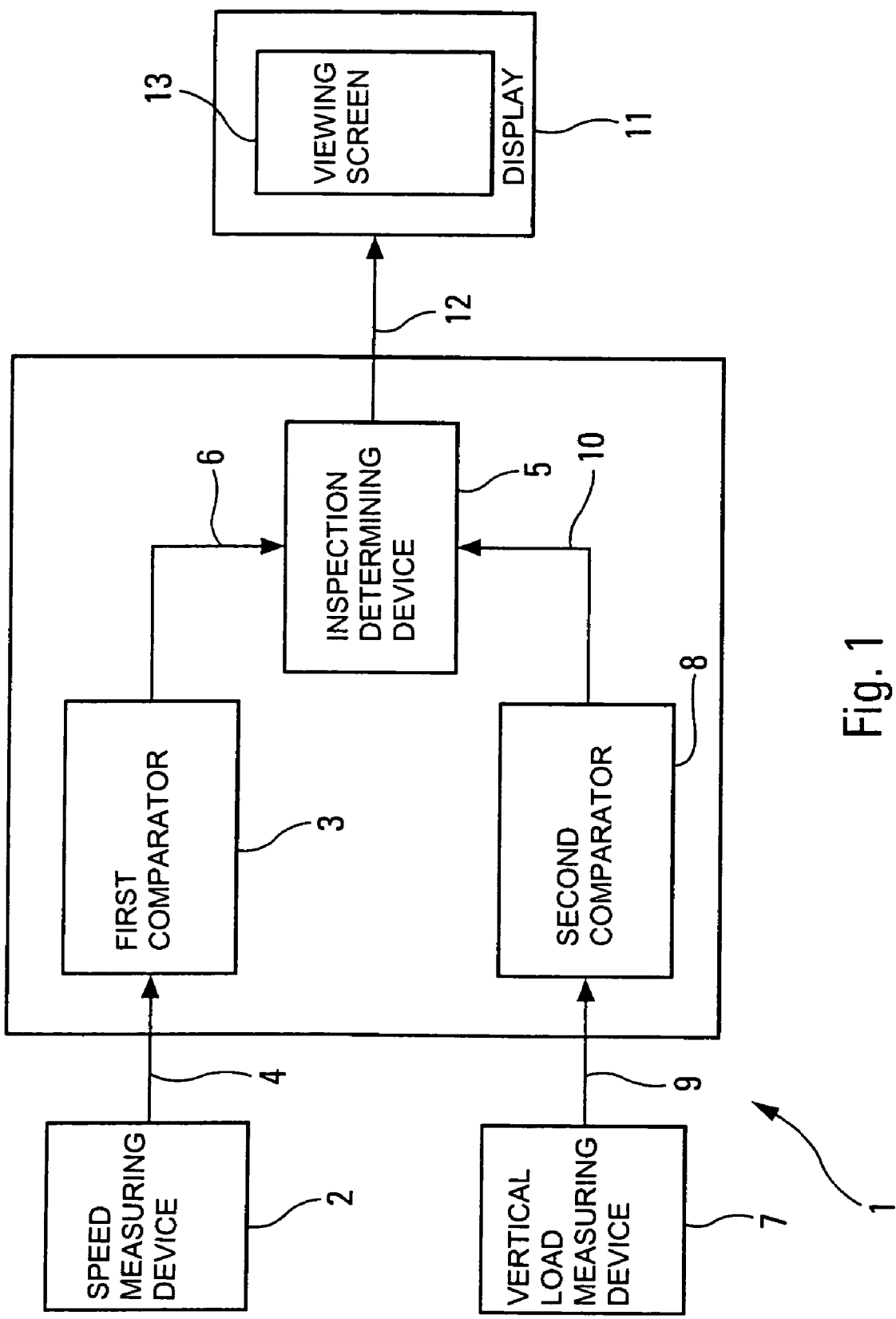
FIG. 1 is the schematic diagram of a device in accordance with the invention.

The device 1 in accordance with the invention and represented diagrammatically in FIG. 1 is intended to detect on an aircraft (not represented), in particular a military transport aircraft, an overshoot of design loads at the level of a structural part of said aircraft, for example the airfoil [that is to say either directly on the wings of the aircraft which form said airfoil, or on elements (slats, flaps, ailerons, spoilers, etc) that are arranged on said wings].

To do this, said device 1 is of the type comprising:
usual means 2 for measuring an effective speed Veff of the aircraft;
means 3 which are connected by a link 4 to the means 2, to carry out a first comparison, by comparing this measured effective speed Veff with at least one maximum speed relating to at least the current flight configuration of the aircraft. Said maximum speed may also depend on at least one particular characteristic (open door, under-airfoil carriage, fuel distribution, etc.) of the aircraft; and
means 5 which are connected by a link 6 to the means 3, to determine whether a structural inspection needs to be performed at the level of said structural part, at least on the basis of the result of said first comparison.

According to the invention:
said device 1 furthermore comprises:
means 7 for measuring a (effective) vertical load factor Nzeff of the aircraft; and
means 8 which are connected by a link 9 to the mean 7, for carrying out a second comparison, by comparing said measured vertical load factor Nzeff (preferably previously filtered) with at least one limit value of vertical load factor; and said means 5 which are connected by a link 10 to the means 8, are formed so as to determine whether a structural inspection needs to be performed at the level of said structural part, on the basis of the results of said first and second comparisons, received from said means 3 and 8. Preferably, the result of a comparison needs to be confirmed for a predetermined duration (for example 300 ms) before being taken into account.

Said device 1 also comprises means 11 which are connected by a link 12 to said means 5 and which are intended to indicate to an operator, for example a maintenance operator or a pilot of the aircraft, as the case may be, that a structural inspection needs to be performed. These means 11 may in particular comprise display means making it possible to display on a viewing screen 13 the aforesaid indications. They may also comprise printing means and/or alarm means, for example, of audio type and/or of visual type.

In a particular embodiment, said means 8 compare said measured vertical load factor Nzeff with an upper limit value Nzsup1, Nzsup2 (which depend on the weight of the aircraft) and with a lower limit value Nzinf1, Nzinf2, said means 3 compare said measured effective speed Veff with a first maximum speed VF, VMO and with a second maximum speed Vmax1, Vmax2 (which is greater than said first maximum speed VF, VMO), and said means 5 indicate that a structural inspection needs to be performed, when one of the following three conditions is achieved:

said measured effective speed Veff is below said first maximum speed VF, VMO and said measured vertical load factor Nzeff is outside a first domain DA1, DA2 formed by said upper and lower limit values;

said measured effective speed Veff lies between said first maximum speed VF, VMO and said second maximum speed Vmax1, Vmax2 and said measured load factor Nzeff is outside a second predetermined domain DB1, DB2; and said measured effective speed Veff is greater than said second maximum speed VF, VMO.

Within the context of the present invention, the maximum speeds are determined with respect to speeds VFE, VMO, VLE specified hereinbelow, which are obtained in usual fashion with the aid of load models.

These speeds VFE, VMO, VLE depend on the flight configurations of the aircraft. The same goes for the limit values of vertical load factor Nzsup1, Nzsup2, Nzinf1, Nzinf2 used for the implementation of the invention.

Firstly, when the aircraft is in a first flight configuration, for which lift-enhancing elements are deployed on the wings, consideration is given to a speed VFE ("Flap Extended Speed") which represents a maximum speed with lift-enhancing elements deployed.

It is known that, in particular to improve the performance on takeoff and landing, the airfoil of aircraft are generally equipped with such lift-enhancing elements (namely slats at the leading edge of the wings and flaps at the trailing edge) which are deployable and retractable, and which make it possible to substantially increase the lift generated for a given angle of incidence, when they are deployed, and also to delay the phenomenon of stalling.

Figure 2:
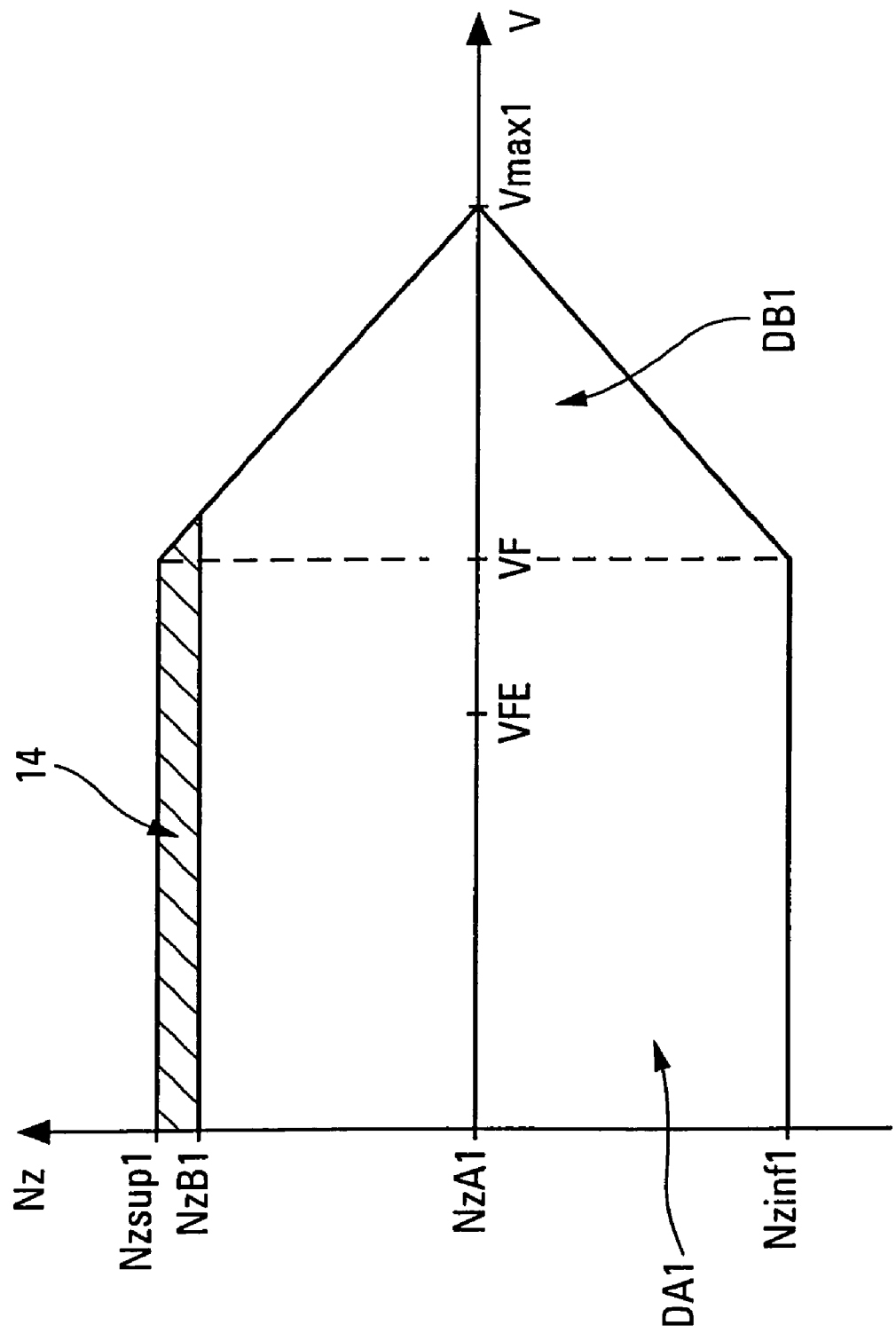
FIGS. 2 and 3 are graphics that allow a proper explanation of the subject of the present invention for two different flight configurations of the aircraft.

In this case, as represented in FIG. 2 illustrating a graphic comprising the speed (or Mach number) V of the aircraft as abscissa and the vertical load factor Nz as ordinate, said first maximum speed VF satisfies the relation VF=VFE+k, k being a value dependent on the position of said lift-enhancing elements, and said second maximum speed Vmax1 satisfies the relation Vmax1=VF+V1, V1 being a predetermined speed value.

In a particular embodiment, k equals 4 knots (around 2 m/s); and

V1 equals 15 knots (around 7.5 m/s).

Thus, in this case, said means 8 compare said measured vertical load factor Nzeff with the upper limit value Nzsup1 and with the lower limit value Nzinf1, said means 3 compare said measured effective speed Veff with the first and second maximum speeds VF and Vmax1, and said means 5 conclude that a structural inspection needs to be performed, when one of the following three conditions is achieved:

said measured effective speed Veff is below said first maximum speed VF and said measured vertical load factor is outside the first domain DA1 formed by said upper and lower limit values Nzsup1 and Nzinf1;

said measured effective speed Veff lies between said first and second maximum speeds VF and Vmax1, and said measured load factor Nzeff is outside the second domain DB1 of triangular form, as represented in FIG. 2; and said measured effective speed Veff is greater than said second maximum speed Vmax1.

In a particular embodiment:

Nzsup1 equals 2 g, g being the acceleration due to gravity;

NzA1 equals 1 g; and

Nzinf1 equals 0 g.

Consequently, when one is outside the zone formed by the domains DA1 and DB1 of the graphic of FIG. 2, the means 11 apprise an operator, for example a pilot of the aircraft or a maintenance operator, that an inspection (or maintenance check) needs to be carried out on the structural part of the aircraft and on the elements which are mounted on said part.

Represented moreover in FIG. 2 is a marginal zone 14 which is defined between said upper limit value Nzsup1 and an auxiliary value NzB1, for example 1.8 g, for speed values below the speed VF.

When the aircraft enters this marginal zone 14, the device 1 issues a corresponding cue, which may in particular be used for statistical purposes by airlines.

Secondly, when the aircraft is in a second flight configuration, for which the lift-enhancing elements (flaps and slats) are in the cruising position, consideration is given to a speed VMO corresponding to a maximum speed of use ("Velocity Maximum Operation").

Figure 3:
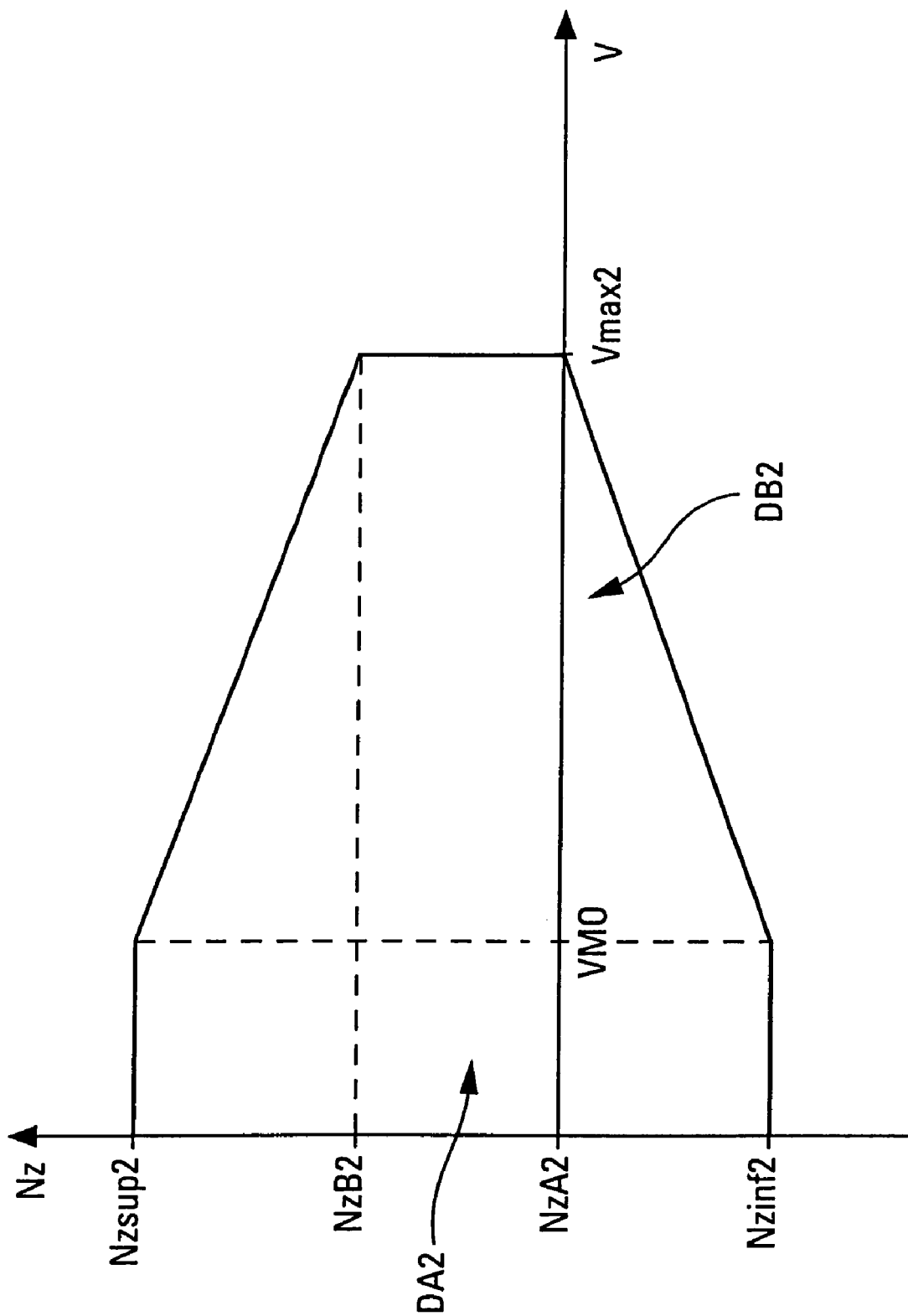

In this case which is represented in FIG. 3, said first maximum speed corresponds to said maximum speed of use VMO, and said second maximum speed Vmax2 satisfies the relation Vmax2=VMO+V2, V2 being a predetermined speed value, for example 23 knots (around 12 m/s).

Thus, in this case, said means 8 compare said measured vertical load factor Neff with the upper limit value Nzsup2 and with the lower limit value Nzinf2, said means 3 compare said measured effective speed Veff with the first and second maximum speeds VMO and Vmax2, and said means 5 conclude that a structural inspection needs to be performed, when one of the following three conditions is achieved:

said measured effective speed Veff is below said first maximum speed VMO and said measured vertical load factor Nzeff is outside a first domain DA2 formed by said upper and lower limit values Nzsup2 and Nzinf2;

said measured effective speed Veff lies between said first and second maximum speeds VMO and Vmax2, and said measured load factor Nzeff is outside the second domain DB2 represented in FIG. 3; and said measured effective speed Veff is greater than said second maximum speed Vmax2.

In a particular embodiment:
Nzsup2 equals 2.5 g;
NzB2 equals 1 g;
NzA2 equals 0 g; and
Nzinf2 equals −1 g.

Consequently, when one is outside the darkened zone (domains DA2 and DB2) of the graphic of FIG. 3, the means 11 apprise an operator, for example a pilot of the aircraft or a maintenance operator, that an inspection (or maintenance check) needs to be carried out on the structural part of the aircraft and on the elements which are mounted on said part.

Thirdly, when the aircraft is in a third flight configuration, for which the main landing gear of the aircraft is down, consideration is given to a speed VLE corresponding to a maximum speed with landing gear down.

In this case, the invention is implemented on the basis of a graphic similar to that of FIG. 3.

In a particular embodiment, said device 1 compares said measured effective speed Veff with an auxiliary maximum speed Vaux, for example VFE+4 knots, VMO+4 knots or VLE+4 knots, and it issues a maximum speed overshoot warning, when said measured effective speed Veff is greater than said auxiliary maximum speed Vaux. This warning makes it possible to apprise the crew that the aircraft has left the authorized flight domain, so that they may act such as to rectify the speed of the aircraft. Nevertheless, this condition alone does not compel the airline to perform the maintenance check, in contrary distinction to the known solutions specified hereinabove.

In a particular embodiment, at least one of the thresholds (maximum speed, limit value, etc.) used for the comparisons is tailored to the structural parts of the aircraft that are taken into account (airfoil, slats, ailerons, spoilers, flaps, etc).

Additionally, in a particular embodiment:
said device 1 furthermore comprises integrated means (not explicitly represented);
for measuring the value of one or more additional particular parameters; and
for carrying out one or more additional comparisons, by comparing the value of said additional particular parameter or parameters with one or more corresponding limit values; and
said means 5 are formed so as to determine whether a structural inspection needs to be performed at the level of said structural part, by also taking account of the results of said additional comparison or comparisons.

Preferably, the device 1 takes into account, as additional particular parameter, at least one of the following parameters:
the weight of the aircraft;
the centering of the aircraft;
the dynamic pressure; and
at least one particular cue (for example a cue relating to a strain gauge).

The invention claimed is:

1. A process for detecting on an aircraft an overshoot of design loads at a level of a structural part of said aircraft, according to which process the following steps are carried out repetitively and automatically:
a) measuring an effective speed of the aircraft;
b) performing a first comparison, by comparing said measured effective speed with at least one maximum speed relating at least to a current flight configuration of the aircraft;
measuring a vertical load factor of the aircraft;
performing a second comparison, by comparing said measured vertical load factor with at least one limit value of the vertical load factor; and
c) determining whether a structural inspection needs to be performed at the level of said structural part, at least on a basis of a result of said first and second comparisons,
wherein, repetitively and automatically:
before said step c):
a value of at least one additional particular parameter is measured, said additional particular parameter being chosen from one of the following parameters:
a weight of the aircraft;
a centering of the aircraft;
a dynamic pressure; and
at least one particular cue; and
an additional comparison is carried out, by comparing said measured value with at least one limit value of said particular parameter; and
step c) includes determining whether a structural inspection needs to be performed at the level of said structural part, by also taking account of the result of said additional comparison.

2. A process as claimed in claim 1, wherein said measured vertical load factor is compared with an upper limit value and with a lower limit value, wherein in step b), said measured effective speed is compared with first and second maximum speeds, and wherein in step c), a conclusion is made that a structural inspection needs to be performed, when one of the following three conditions is achieved:
said measured effective speed is below said first maximum speed and said measured vertical load factor is outside a first domain formed by said upper and lower limit values;
said measured effective speed lies between said first and second maximum speeds and said measured load factor is outside a second predetermined domain; and
said measured effective speed is greater than said second maximum speed.

3. The process as claimed in claim 2, wherein, when lift-enhancing elements of the airfoil of the aircraft are deployed, said first and second maximum speeds depend on a maximum speed with deployed lift-enhancing elements VFE.

4. The process as claimed in claim 3, wherein said first maximum speed VF satisfies the relation VF =VFE +k, k being a value dependent on the position of said lift-enhancing elements, and wherein said second maximum speed Vmax1 satisfies the relation Vmax1=VF+V1, V1 being a predetermined speed value.

5. The process as claimed in claim 2, wherein, when the aircraft is in a cruising configuration, said first and second maximum speeds depend on a maximum speed of use VMO.

6. The process as claimed in claim 5, wherein said first maximum speed corresponds to said maximum speed of use VMO, and wherein said second maximum speed Vmax2 satisfies the relation Vmax2=VMO+V2, V2 being a predetermined speed value.

7. The process as claimed in claim 2, wherein, when the main landing gear of the aircraft is down, said first and second maximum speeds depend on a maximum speed with landing gear down.

8. A process as claimed in claim 1, wherein in step b), said measured effective speed is compared with an auxiliary maximum speed, and wherein in step c), a maximum speed overshoot warning is issued when said measured effective speed is greater than said auxiliary maximum speed.

9. The process as claimed in claim 1, wherein said maximum speed also depends on at least one particular characteristic of the aircraft.

10. The process as claimed in claim 1, wherein said measured vertical load factor is filtered before being compared with at least one limit value.

11. The process as claimed in claim 1, wherein in step c), the result of at least one comparison needs to be confirmed over a predetermined duration before being taken into account.

12. The process as claimed in claim 1, wherein at least one of the thresholds used for a comparison depends on structural parts of the aircraft that are taken into account.

13. A device for detecting on an aircraft an overshoot of design loads at a level of a structural part of said aircraft, said device comprising,
- a speed measuring device that measures an effective speed of the aircraft;
- a first comparator that compares said measured effective speed with at least one maximum speed relating to a current flight configuration of the aircraft;
- a load measuring device that measures a vertical load factor of the aircraft;
- a second comparator that compares said measured vertical load factor with at least one limit value of vertical load factor; and
- an inspection determining device that determines whether a structural inspection needs to be performed at the level of said structural part, at least on a basis of a result of said first and second comparisons, wherein:
- said device furthermore comprises an integrated device,
  - for measuring a value of at least one additional particular parameter, said additional particular parameter being chosen from one of the following parameters:
    - a weight of the aircraft;
    - a centering of the aircraft;
    - a dynamic pressure; and
    - at least one particular cue; and
  - for carrying out at least one additional comparison, by comparing the value of said additional particular parameter with a corresponding limit value; and
- said inspection determining device determines whether a structural inspection needs to be performed at the level of said structural part, by also taking account of the results of said additional comparison.

14. The device as claimed in claim 13, which moreover comprises an indicator that indicates to an operator as appropriate, that a structural inspection needs to be performed.

15. An aircraft, which comprises a device such as that specified under claim 13.

16. An aircraft, which comprises a device able to implement the process specified under claim 1.

* * * * *